United States Patent Office 2,797,110
Patented June 25, 1957

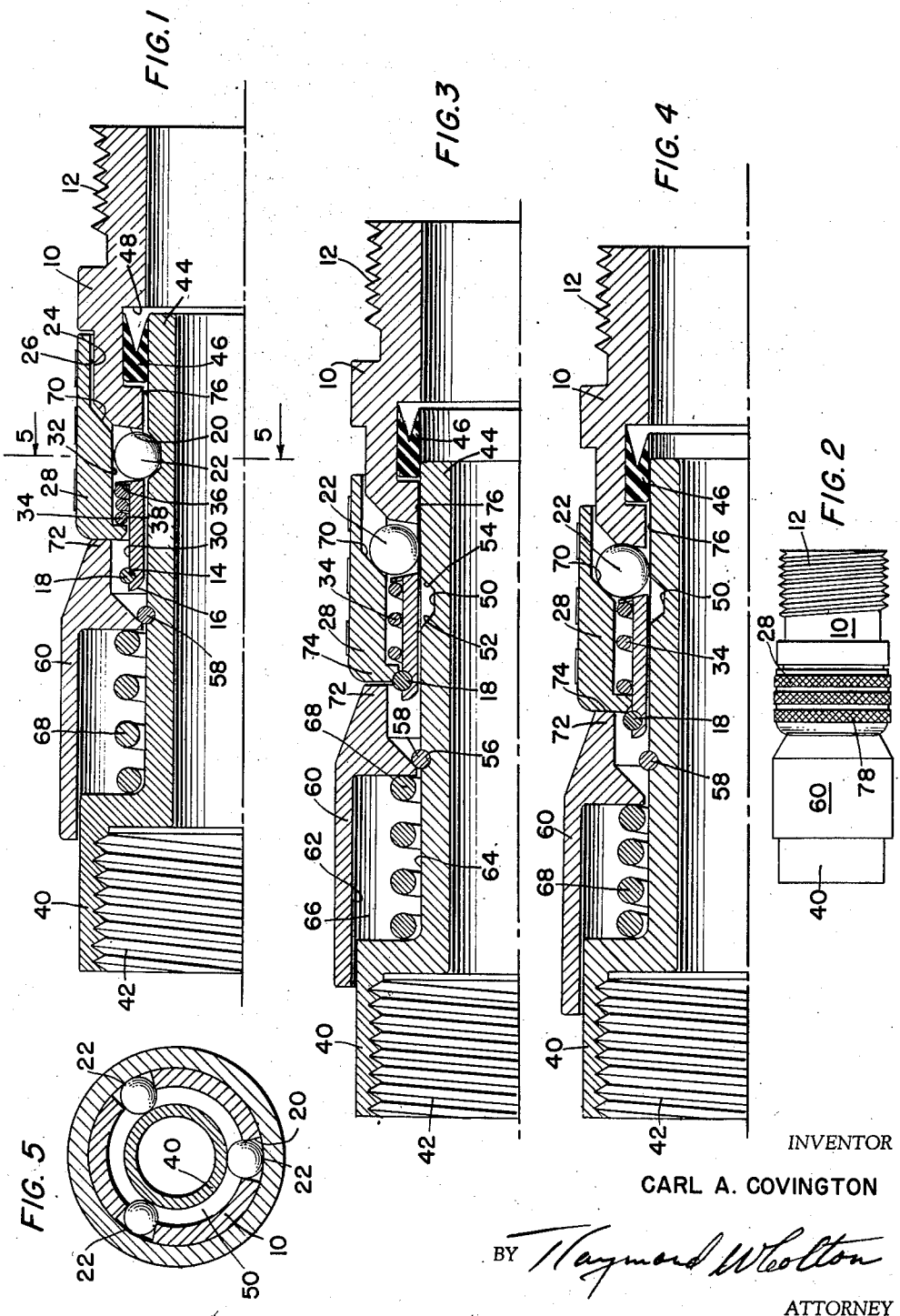
June 25, 1957 — C. A. COVINGTON — 2,797,110
BALL DETENT COUPLING
Filed April 4, 1956
INVENTOR
CARL A. COVINGTON
BY
ATTORNEY

2,797,110

BALL DETENT COUPLING

Carl A. Covington, Alexandria, Va.

Application April 4, 1956, Serial No. 576,146

7 Claims. (Cl. 285—86)

This invention relates to a coupling of the plug and socket type.

The coupling of the present invention has been designed to produce a positive action, ease of assembly and yet the major parts can be produced on an automatic screw machine. Thus, production costs can be maintained at a minimum without sacrificing quality and performance.

The coupling comprises a socket member having an open end and a plurality of radial openings, a detent in each of the openings, a first sleeve slidably carried by the socket member having detent confining and detent releasing positions, the sleeve providing cam means engageable with the detents for imparting radially inward confining positions thereto, a first spring interposed between the socket member and sleeve biasing the sleeve towards a detent releasing position, a plug member having an end receivable in the open end of the socket member and containing an external groove adapted to receive the detents, a second sleeve slidably carried by the plug member, the second sleeve having a bore adapted to receive the end of the socket member and a surface adapted to abut the first sleeve, and a second spring of greater force than the first interposed between the plug member and second sleeve biasing the second sleeve towards the first sleeve to overcome the force of the first spring during assembly of the members.

The end of the socket member extends beyond the adjacent end of the first sleeve in a preferred form of the invention and similarly, it is preferred that the end of the plug member extend beyond the adjacent end of the second sleeve. It is also preferred that the first sleeve enclose the first spring and the second sleeve enclose the second spring.

The coupling is eminently suited for use in fluid lines and under these circumstances, the members are tubular and a fluidtight packing is interposed between them. The socket member under such circumstances preferably contains an internal groove and a pressure packing is supported in the groove for engagement with the end of the plug member under assembled conditions.

A more complete understanding of the invention will follow from a detailed description of the accompanying drawings wherein:

Fig. 1 is a fragmentary sectional elevation depicting a coupling according to the present invention in assembled condition;

Fig. 2 is an elevation of a coupling of the type shown in Fig. 1;

Fig. 3 is a fragmentary sectional elevation showing the relationship of parts at the beginning of a coupling operation;

Fig. 4 is a fragmentary sectional elevation showing the relationship of parts at an intermediate stage of a coupling operation; and Fig. 5 is a section taken along line 5—5 of Fig. 1.

A socket member 10 is shown as having external threads 12 formed on one end thereof and having a groove 14 adjacent its other end 16 to receive a retaining ring 18. The socket member is provided with a plurality, preferably an odd number, of frusto conical radial bores or openings 20 for the reception of detents 22 depicted as balls. Intermediate the bores and the threaded end of the socket member, a cylindrical surface 24 is formed to serve as a guide for a complementary surface 26 formed on a sleeve 28. Between the bores 20 and the groove 14, the socket member is formed with a reduced cylindrical surface 30 which defines with a reduced surface 32 of the sleeve 28, a chamber for the reception of a helical spring 34 whose ends are interposed between a shoulder 36 on the socket member and a shoulder 38 on the sleeve biasing the sleeve towards the limiting position provided by the resilient ring 18 so that the detents 22 will tend to receive a released position as depicted in Figs. 3 and 4.

The plug member 40 is provided with internal threads 42 at one end, its opposite end 44 projecting into the socket member 10 for engagement with a fluid packing 46 suitably supported in an annular groove 48 formed internally of the socket member. The plug member is provided with an external groove 50 having inclined sides 52 and 54 which cooperate with the detents 22. Between the groove 50 and the threaded end of the plug member 40, another groove 56 is provided for the reception of a resilient ring 58 serving as a stop for a sleeve member 60 whose counterbore 62 cooperates with the cylindrical surface 64 of the plug member to define a housing 66 for a spring 68 having a force exceeding that of the spring 34 housed between the socket member 10 and its sleeve 28.

Intermediate the reduced surface 32 of the sleeve 28 for confining the detents radially inwardly and the enlarged surface 26 thereof which permits the detents to move outwardly in their released positions, a cam surface 70 is provided for bearing engagement with the detents so as to transmit the force tending to confine them.

As viewed in Fig. 3, the end 44 of the plug member 40 has been introduced into the open end of the socket member 10 to a point just before the leading end 72 of the sleeve 60 abuts the leading end 74 of the sleeve 28. Under these conditions, both springs 34 and 68 are fully extended. As the plug member 40 is moved farther into the socket member 10, the leading end 72 of the sleeve 60 abuts the leading end 74 of the sleeve 28, imposing the force of the spring 68 upon the detents 22 tending to direct them inwardly because of the inclination of the cam surface 70. However, the surface 76 formed on the leading portion of the plug member 40 prevents inward movement of the balls so that the spring 68 becomes compressed as depicted in Fig. 4. This compression, and of course movement of the sleeve 60, continues until the groove 50 registers with the detents 22 whereupon the spring 68 expands forcing its sleeve 60 forwardly and the sleeve 28 to the right as viewed in the drawings, compressing the weaker spring 34, driving the detents 22 inwardly and latching them in the groove 50 by means of the reduced portion 32 of the sleeve 28.

To disengage the members it is only necessary to retract the sleeve 60 on its plug member 40 against the force of the spring 68 until the weaker spring 34 shifts the sleeve 28 towards the resilient ring 18 carried by the socket member 10, releasing the balls and permitting retraction of the plug member from the socket member.

The resilient rings 18 and 58 may be split metallic rings or continuous rubber rings or may assume such other forms as are consistent with proper operation and low cost. The packing 46 may assume various forms of which there are many commercially available. The sleeve 28 is shown as provided with knurling 78 to facilitate its operation, it being understood that release of the parts may be accomplished by shifting the sleeve 28 against the force of the spring 68 as an alternative to retraction of the sleeve 60.

Whereas only one specific form of the invention has been shown and described, variations such as those as would be suggested to workers skilled in the art are contemplated. Accordingly, the invention should not be restricted beyond the scope of the appended claims.

I claim:

1. A coupling comprising a socket member having an open end and a plurality of radial openings, a detent in each of said openings, a first sleeve slidably carried by said socket member having detent confining and detent releasing positions, said sleeve providing cam means engageable with said detents for imparting radially inward confining positions thereto, a first spring interposed between said socket member and sleeve biasing said sleeve towards a detent releasing position, a plug member having an end receivable in said open end of said socket member and containing an external groove adapted to receive said detents, a second sleeve slidably carried by said plug member, said second sleeve having a bore adapted to receive said end of said socket member and a surface adapted to abut said first sleeve, and a second spring of greater force than the first interposed between said plug member and second sleeve biasing said second sleeve towards said first sleeve to overcome the force of said first spring during assembly of said members.

2. A coupling as set forth in claim 1 wherein said end of said socket member extends beyond the adjacent end of said first sleeve.

3. A coupling as set forth in claim 1 wherein said end of said plug member extends beyond the adjacent end of said second sleeve.

4. A coupling as set forth in claim 1 wherein said first sleeve encloses said first spring.

5. A coupling as set forth in claim 1 wherein said second sleeve encloses said second spring.

6. A coupling as set forth in claim 1 wherein said members are tubular and a fluid tight packing is interposed therebetween.

7. A coupling as set forth in claim 1 wherein said members are tubular, said socket member contains an internal groove, and a pressure packing is supported in said groove for engagement with said end of said plug member under assembled conditions.

References Cited in the file of this patent

UNITED STATES PATENTS

| | | |
|---|---|---|
| 810,354 | Scanlon | Jan. 16, 1906 |
| 2,377,812 | Scheiwer | June 5, 1945 |